Jan. 1, 1957  R. E. HOLMES ET AL  2,775,857
OSCILLATING BLADE EDGER
Filed March 3, 1953  2 Sheets-Sheet 2
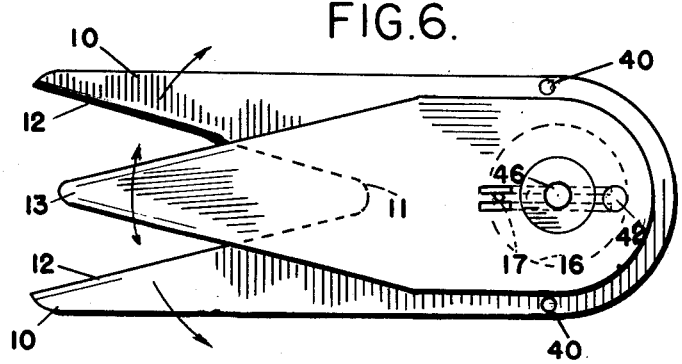
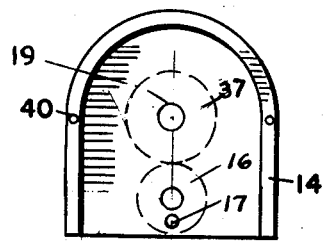
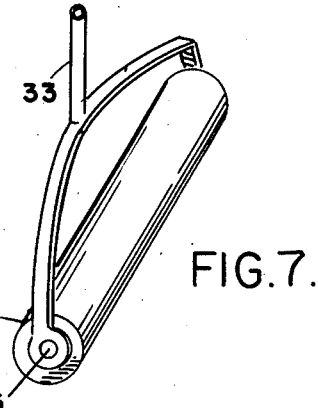
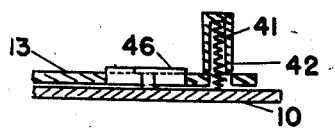
INVENTORS
ROLAND E. HOLMES.
RUSSELL C. BALES
BY *Howard J. Whelan*
ATTORNEY

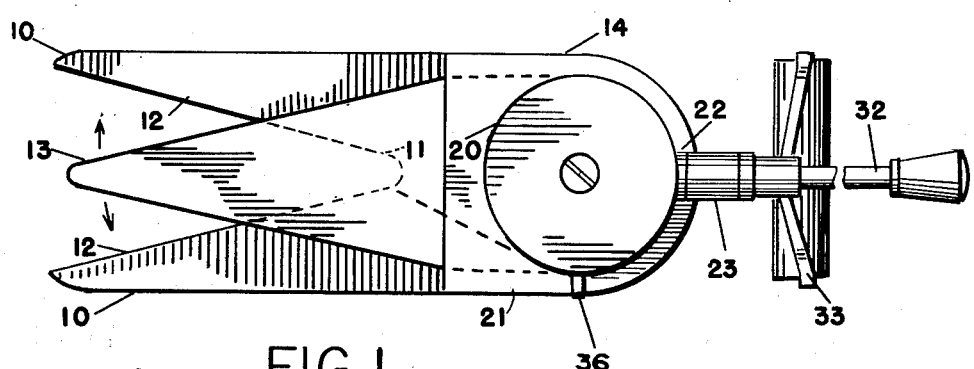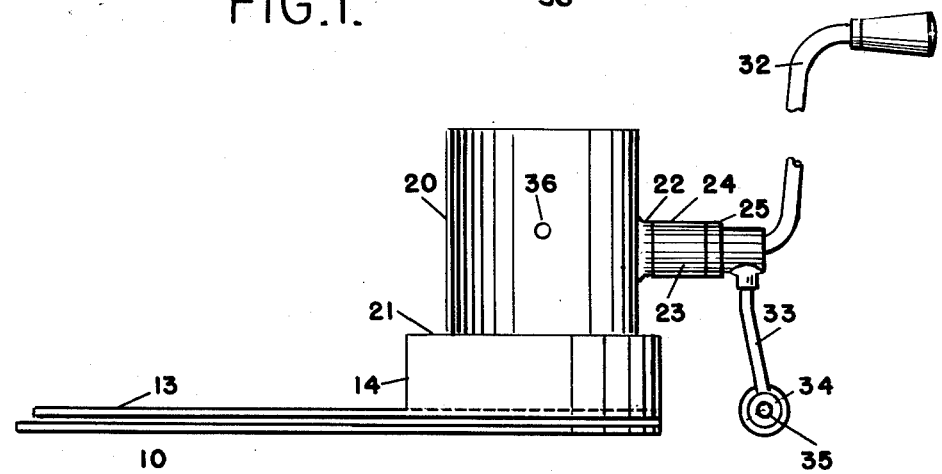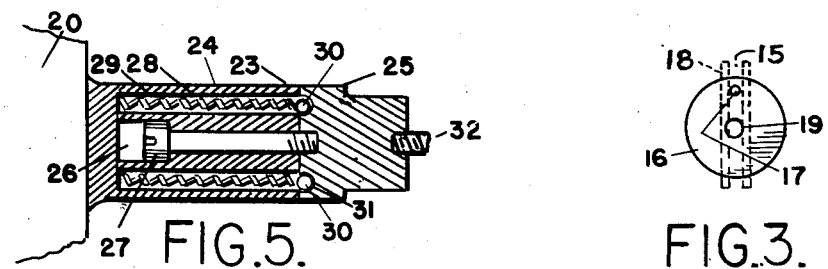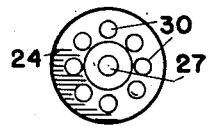

United States Patent Office 2,775,857
Patented Jan. 1, 1957

2,775,857
OSCILLATING BLADE EDGER

Roland E. Holmes and Russell C. Bales, Baltimore, Md.

Application March 3, 1953, Serial No. 339,972

1 Claim. (Cl. 56—26.5)

This invention refers to agricultural equipment and more particularly to those pertaining to the trimming or cutting of grass, small shrubs, hedges and vegetation found on lawns and grass plots.

The trimming of lawn edges is usually performed with garden shears actuated by hand, and is laborious and slow. In some instances power is applied and the trimming device is made somewhat on the line of a modified lawn mower. It is cumbersome, expensive, and hard to manipulate. In this invention the device is of simple design with shear blades included in its structure. It is operated by a small motor and made so light, convenient, and compact that it can be manipulated by the use of a single hand of an operator, and adjusted to divers angles to suit the needs of the work to be done.

To attain these features and to make the device thoroughly practical, the structure of the invention is designed to meet certain objects, one of which is to provide a new and improved garden trimmer that will avoid one or more of the disadvantages of the prior art and its limitations.

Another object of the invention is to provide a new and improved grass trimmer that can be held and manipulated by hand, with the inclusion of means to vary the cutting angle.

A further object of this invention is to provide a new and improved grass or lawn edge trimmer or cutter to cut the vegetation as it rolls along the ground, and has a motor incorporated in its structure capable of performing this type of work rapidly and effectively, and yet not adding to its weight to any substantial extent and without making the device cumbersome.

Other objects of the invention will be noted as it is more fully detailed and the principles and operation described.

In order to make the invention clear, reference is made to the accompanying drawings. These drawings when used in conjunction with the following description emphasize a particular form of the invention as an example, and the claims define the scope of the invention and the particular element on which it is based.

Referring to the drawings in which:

Figure 1 is a plan view of an oscillating blade edge trimmer device embodying this invention;

Figure 2 is a side elevation of Figure 1;

Figure 3 is a detail of the propelling disc mechanism employed in this embodiment;

Figure 4 is a view looking into the stationary cap member of the swivel coupling used in this embodiment;

Figure 5 is an enlarged longitudinal sectional view through the coupling;

Figure 6 is a plan detail of the blades used in this embodiment;

Figure 7 is a perspective detail of the roller and arm;

Figure 8 is a sectional detail through the pivot and blade tensioning device; and Figure 9 is an upward view of the body support for the blade mechanism.

Similar reference characters pertain to the same parts in all the drawings.

In the construction shown, a cutter head comprises a pair of flat and straight but triangularly contoured knife blades 10, positioned in openly spread V-form and integrally connected at the junction 11. The blades are sharpened on the sides 12 and cooperate to effectively cut vegetation when sheared over by a fast moving single triangular double edge blade 13. The junction 11 or base of the dually formed blades 10 is fastened by screws 40 to the body 14 of the trimmer. This makes the blades 10 stationary. The blade 13 oscillates through a predetermined arc sufficient to cross over both blades 10 and shear off grass engaged between them, when the device is pushed along. The blade 13 is placed above the blades 10 and its stroke is controlled by the side of the slot 15.

The mechanism used in the operation of the blade 13, consists of a gear disc 16 with its propelling peripheral pin 17 in contact with the interior surface of slot 15 of dual lugs 18 on the face of the blade. The pin 17 is rotated by a gear 37 attached to shaft 19 extending from the motor 20, located on the upper face 21 of the body 14. This is a well known conventional device used for changing a rotary to a reciprocating motion. This mechanism moves the blade 13 back and forth through a predetermined arc and causes it to cut any vegetation caught between its knife edges and those of the stationary blades 10. The housing of the motor is provided with a boss 22 on which a swivel coupling 23 is attached. This swivel coupling 23 consists of double cylinder members 24 and 25. The member 24 is fastened stationarily to the boss 22. This member 24 has a number of recesses 28 preferably eight concentrically arranged around a central passage 26 adapted to hold a fillister head screw 27 used to secure the member 25 rotatably attached to it. The recesses 28 hold coil springs 29 that resiliently press balls 30 into the slots 31 in the member 25 to hold the members frictionally tight. The member 25 can be revolved by force from one set of slots to another by moving the long handle 32. This handle enables the user to roll the cutterhead along the grass to be trimmed. Attached to the handle 32 adjacent to the coupling 23 is an extending arm 33 of bifurcated form adapted to straddle and hold a roller 34 and its shaft 35. This arm 33 screws in and out of member 25 and regulates the distance between the ground and the cutter head and controls the height of the vegetation being cut. The blade 13 is pivoted at 46 on the junction 11 of blades 10 and the cutting edges of the blades are resiliently tensioned by a spring 41 pressing, at one end, on a shell 42 attached to the moving blade 13 and, at the other end, on the blades 10.

In the operation of the device the user holding the handle 32, places the cutter head close to the grass to be trimmed and starts the motor so that the blade 13 oscillates across the blades 10, and cuts vegetation between them. The motor is fed through a cable 36 passing to it in a conventional manner and is controlled by a suitable switch. The cutter head is rolled along on the roller 34 and the swivel is rotatably adjusted to hold the cutter head at the desired angle. The balls 30 retract resiliently to enable this to be done in a conventional manner.

The cutter head can be removed from the handle and operated as a hand machine if preferred. In which case the angle of cutting the vegetation is determined by the way the user holds the cutter in his hand.

While but one general form of the invention is shown in the drawings and described in the specification, it is not desired to limit this application for patent to this particular form as it is appreciated that other forms of construction could be made that would use the same principles and come within the scope of the appended claim.

Having thus described the invention, what is claimed is:

A power operated cutter, comprising, a motor casing having a motor therein, a body portion depending from said casing, a stationary V-shaped cutter carried by said portion, a double edged cutting blade pivoted to said cutter, connecting means between said motor and said cutting blade for oscillating the latter, a handle for said power cutter and a quick-adjustable, flexible connection between said motor casing and said handle to vary the cutting angle, said connection consisting of a hollow boss carried laterally by said motor casing, said handle abutting the open end of said boss, springs in said boss pressing against balls in said handle allowing rotation of said handle about said boss, and retaining means in said boss to prevent disconnection between said boss and said handle.

References Cited in the file of this patent

UNITED STATES PATENTS

| | | |
|---|---|---|
| 1,860,316 | Clark | May 24, 1932 |
| 2,286,552 | Klose | June 16, 1942 |
| 2,503,348 | Miller | Apr. 11, 1950 |
| 2,504,259 | Ford | Apr. 18, 1950 |
| 2,574,947 | Allen | Nov. 13, 1951 |
| 2,629,220 | Grieder | Feb. 24, 1953 |
| 2,652,626 | Dutcher | Sept. 22, 1953 |